(12) United States Patent
Suess et al.

(10) Patent No.: US 12,729,753 B2
(45) Date of Patent: Sep. 8, 2026

(54) MULTI-COMPONENT GEAR WHEEL FOR A GEAR ASSEMBLY OF A BRAKE ACTUATOR, BRAKE ACTUATOR HAVING SUCH A MULTI-COMPONENT GEAR WHEEL, AND METHOD FOR PRODUCING SUCH A MULTI-COMPONENT WHEEL

(71) Applicant: IMS GEAR SE & CO. KGAA, Donaueschingen (DE)

(72) Inventors: Marius Suess, Blumberg (DE); Sebastian Birk, Trossingen (DE); Michael Knoepfle, Huefingen (DE); Paul Schachtschneider, Villingen-Schwenningen (DE); Eugen Stoppel, Muehlingen (DE); Michael Dold, Braeulingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 451 days.

(21) Appl. No.: 18/225,303

(22) Filed: Jul. 24, 2023

(65) Prior Publication Data

US 2024/0035552 A1 Feb. 1, 2024

(30) Foreign Application Priority Data

Jul. 29, 2022 (EP) .................................... 22187854

(51) Int. Cl.
*F16H 25/24* (2006.01)
*B29C 45/14* (2006.01)
(Continued)

(52) U.S. Cl.
CPC ............. *F16H 25/24* (2013.01); *F16D 65/16* (2013.01); *F16H 55/06* (2013.01); *F16H 55/22* (2013.01);
(Continued)

(58) Field of Classification Search
CPC ..... B60T 13/741; B60T 13/746; B29C 45/14; B29L 2015/003; F16D 65/14;
(Continued)

(56) References Cited

U.S. PATENT DOCUMENTS 5,931,438 A * 8/1999 Brouwer ................ B60R 1/072
74/424.77
11,287,002 B1 3/2022 Kong et al.
(Continued)

FOREIGN PATENT DOCUMENTS

| CN | 110550010 | 12/2019 |
|---|---|---|
| EP | 3674582 A1 | 8/2020 |
| WO | 2012/010256 A1 | 1/2012 |

OTHER PUBLICATIONS

Search report issued Jan. 25, 2023 in corresponding EP application No. 22187854.9.

*Primary Examiner* — Robert A. Siconolfi
*Assistant Examiner* — San M Aung
(74) *Attorney, Agent, or Firm* — Nath, Goldberg & Meyer; Jerald L. Meyer; Morgan D. Rosenberg

(57) ABSTRACT

A multi-component gear wheel (10) for a gear assembly of a brake actuator, in particular of a motor vehicle includes a sleeve-shaped support body (100) made of a first plastic material and a gear wheel body (200) firmly integrally formed onto the support body and made of a second plastic material, which has a lower stiffness and higher elasticity than the first plastic material. The gear wheel body (200) has outer toothing (210) and inner spindle-nut toothing (230) for receiving a spindle (50). The spindle-nut toothing (230) is at least partially axially spaced apart from the outer toothing (210) in one direction. The support body protrudes axially at least partially into the region of the helical gear toothing and into the region of the spindle toothing (230). The support
(Continued)

body (100) has a smaller outer diameter than the helical gear toothing.

17 Claims, 5 Drawing Sheets

(51) Int. Cl.

| | |
|---|---|
| ***B29L 15/00*** | (2006.01) |
| ***F16D 65/16*** | (2006.01) |
| ***F16D 121/24*** | (2012.01) |
| ***F16D 125/40*** | (2012.01) |
| ***F16H 55/06*** | (2006.01) |
| ***F16H 55/22*** | (2006.01) |

(52) U.S. Cl.
CPC ......... *B29C 45/14* (2013.01); *B29L 2015/003* (2013.01); *F16D 2121/24* (2013.01); *F16D 2125/40* (2013.01)

(58) Field of Classification Search
CPC .... F16D 65/16; F16D 66/00; F16D 2066/005; F16D 2121/24; F16D 2125/40; F16D 2125/50; F16D 2125/52; F16D 2200/0034; F16D 2200/0086; F16H 1/16; F16H 1/32; F16H 25/24; F16H 55/06; F16H 55/08; F16H 55/12; F16H 55/17; F16H 55/22; F16H 63/345; F16H 63/3466; F16H 2001/327
USPC ........................................................ 188/72.8
See application file for complete search history.

(56) References Cited

U.S. PATENT DOCUMENTS

| | | | | |
|---|---|---|---|---|
| 2016/0068147 | A1* | 3/2016 | Hatt ........................ | F16H 25/24 74/409 |
| 2018/0257624 | A1* | 9/2018 | Deberling ............... | F16H 25/24 |
| 2021/0380091 | A1* | 12/2021 | Winkler ................ | B60T 13/741 |

* cited by examiner 244
10
100
230
x x
270
260
270
10
244
242
240

10
200
270
260
A
212

A-A
120
102
101
105
102c
230
102b
102a
110
102d
100
135
210
150
250
122
240
X

MULTI-COMPONENT GEAR WHEEL FOR A GEAR ASSEMBLY OF A BRAKE ACTUATOR, BRAKE ACTUATOR HAVING SUCH A MULTI-COMPONENT GEAR WHEEL, AND METHOD FOR PRODUCING SUCH A MULTI-COMPONENT WHEEL

The invention relates to a multi-component gear wheel for a gear assembly of a brake actuator, in particular for a motor vehicle, to a brake actuator having such a multi-component gear wheel, and to a method for producing such a multi-component wheel.

Electromechanical brakes are being used more and more frequently in motor vehicles. Electromechanical brakes are used to brake the motor vehicle independently, particularly in the case of electronic vehicles equipped with brake assistants or completely autonomously driven vehicles.

An example of an electromechanical brake is described in WO 2012/010256 A1. The electromechanical brake comprises an electric motor, a gear assembly and an actuating piston, usually an actuating spindle. The electric motor is operatively connected to the actuating piston via the gear assembly. In the event of braking, the output shaft of the electric motor performs a rotating drive movement which is converted into a translational movement by the gear assembly and serves to drive the actuating piston. The actuating piston is then used to actuate at least one brake shoe which, for example, presses against a brake disk of a wheel brake of a vehicle. Such electromagnetic brakes are usually equipped with multi-stage gearing, in particular multi-stage planetary gearsets, and this requires a not inconsiderable amount of installation space.

In automotive engineering in general, but also in particular in the realization of electromechanical brakes, there is a need to produce motor vehicle components in a way that saves on weight and space. In addition, due to increasing cost pressure, there is a requirement to produce the components required for the vehicles as inexpensively as possible.

This is where the present invention comes in.

The aim of the invention is to provide a multi-component gear wheel for a brake actuator, in particular of a motor vehicle, and an associated brake actuator. The multi-component gear wheel should have a small installation space and be inexpensive to produce and additionally meet the necessary strength requirements. In addition, a method for producing such a multi-component gear wheel is to be provided.

This aim is achieved for a multi-component gear wheel by the features of claim 1.

The dependent claims relate to developments of such a multi-component gear wheel and refer back thereto.

Claim 14 relates to a brake actuator having such a multi-component gear wheel.

Claim 15 relates to a method for producing a multi-component gear wheel according the invention.

The multi-component gear wheel according to the invention is characterized substantially by the following features:

- a sleeve-shaped support body made of a first plastic material,
- a gear wheel body firmly integrally formed onto the support body and made of a second plastic material, which has a lower stiffness and higher elasticity than the first plastic material,
- the gear wheel body has outer toothing and inner spindle-nut toothing for receiving a spindle,
- the spindle-nut toothing is at least partially axially spaced apart from the outer toothing in one direction,

- the support body protrudes axially at least partially into the region of the outer toothing and into the region of the spindle toothing, and
- the support body has a smaller outer diameter than the outer toothing.

Such a multi-component gear wheel according to the invention is characterized by a relatively small installation space combined with high strength, as is required in particular in motor vehicle applications. The gear wheel body is injected around the support body so that the two elements are firmly connected to one another. The support body and the gear wheel body are made of plastic material, with the plastic material for the support body being chosen to have a higher stiffness and lower elasticity than the plastic material of the gear wheel body, which consequently has a lower stiffness and higher elasticity than the plastic material of the support body.

The multi-component gear wheel according to the invention is produced by plastic injection molding using two-component technology.

In one embodiment of the invention, the plastic material for the support body consists of a reinforced/filled plastic, such as glass-fiber-reinforced, aramid-fiber-reinforced, or carbon-fiber-reinforced plastic. For example, a glass-fiber-reinforced polyphenylene sulfide (PPS GF) can be selected as the plastic material for this purpose. This material is relatively stiff and not very elastic.

In a development of the invention, the gear wheel body can consist of a friction-optimized plastic material or a friction-optimized thermoplastic. This is particularly the case for polyoxymethylene (POM). However, other plastic materials are also suitable, provided that low stiffness is ensured without high elasticity.

In one embodiment of the multi-component gear wheel, said wheel has an extension for receiving a radial and/or axial bearing, in particular a ball bearing. The extension is placed on the opposite side of the gear wheel body to the spindle-nut toothing.

The extension can be formed as a circumferential ring having a large number of evenly distributed ribs which are directed radially outward. The outer diameter of the extension is expediently selected to be smaller than the outer diameter of the outer toothing of the multi-component gear wheel.

In another embodiment of the invention, the support body has a central circumferential wall having an inner wall which, at least in the region of the spindle-nut toothing and facing the spindle-nut toothing as viewed in the axial direction and/or as viewed in the radial direction, is in the form of tiers. Such a tiered design of the inner wall of the support body, in which one tier or, at least in some portions, more than one tier is provided, serves to mechanically stabilize the overmolded gear wheel body, particularly in the regions where the gear wheel body is subjected to heavy loads during operation, specifically in the region of the spindle-nut internal toothing.

Distal, rounded support fingers, which are provided on the support body and which are located at an end remote from the outer toothing of the gear wheel body, also serve to provide mechanical stabilization. Expediently, a large number of such distal support fingers are attached to one end of the support body in such a way that, when the multi-component gear wheel has been injection-molded, these fingers reach close to an end of the spindle-nut toothing or even axially overlap said toothing.

In a development of the invention, the support body has, below each tooth of the outer toothing, a wall portion, which projects in a flange- and rib-like manner toward the outer toothing, in order to support the relevant tooth of the outer toothing. Expediently, these wall portions protrude in the manner of ribs at a number corresponding to the number of teeth of the outer toothing so that such a supporting wall portion is formed below each tooth of the outer toothing. This support structure below each tooth of the outer toothing can also be cup-shaped.

In another development of the invention, the wall portion projecting in the manner of a flange below each tooth of the outer toothing is expediently concave, preferably when a corresponding circumferential concave indentation in an end face of the outer toothing opposite the mentioned extension is also concave. Because the spindle generates an axial force, it has to be supported by the ball bearing. Very high stresses occur in the part here.

If a normal radius were used on the outer component here, the stresses would be far too high. Due to the sunken shape, the radius can be increased and the profile can be specifically adjusted so as to reduce the stresses.

The wall thickness is chosen to be constant in the outer body, both to guarantee production (constant wall thicknesses) and to distribute the stresses evenly in the outer body.

According to a development of the invention, the outer toothing of the gear wheel body can be helical gear toothing and in particular helical gearing. Expediently, the support structure of the above-mentioned wall portions, which are placed under the teeth of the outer toothing, is adapted to the helix angle of the toothing, and in particular of helical gearing. The rib-like support structures of the support body below each tooth of the outer toothing thus follow at least approximately the slope of the teeth of the helical toothing. This ensures optimal support of the outer toothing of the gear wheel body by the support body.

A further embodiment of the invention consists in that the support body has undercuts in the region of the outer toothing, there being one undercut for each tooth such that a first end face of a tooth engages the support body in a tiered manner.

In another development, the support body has distally located retaining lugs which engage openings in the gear wheel body when the gear wheel body is over-molded onto the support body. These openings are expediently located at weld lines of the gear wheel body, which appear when the gear wheel body undergoes plastic injection molding. To overmold the support body, plastic material is injected via injection points, e.g., three injection points which are expediently located on the side where the flange-like projection or the cup-shaped wall portions of the support body are provided, into a mold in which the support body has already been inserted or completed. The plastic material then flows into the mold via these three injection points, with the plastic material coalescing and bonding between each two of these injection points. The openings for the retaining lugs of the support body are then expediently placed at these weld lines.

The invention is explained in more detail below using an exemplary embodiment in connection with nine figures, in which:

In the following figures, the same reference symbols designate the same parts with the same meaning, unless a different meaning is explicitly indicated.

FIG. 1 shows a perspective view of a multi-component gear wheel in a specific embodiment, such as can be used, for example, in a brake actuator for a brake system in a motor vehicle. The multi-component gear wheel is provided with the reference number 10 and consists of two plastic parts which are firmly connected to one another by means of plastic injection molding.

The multi-component gear wheel 10 has a support body 100 made of a first plastic material and a gear wheel body 200 made of a second plastic material. Using plastic injection molding, the gear wheel body 200 is firmly integrally molded onto, and in some regions around, the support body 100. Details on this are explained in more detail in connection with the subsequent figures, FIGS. 2 to 9.

Figure 1:
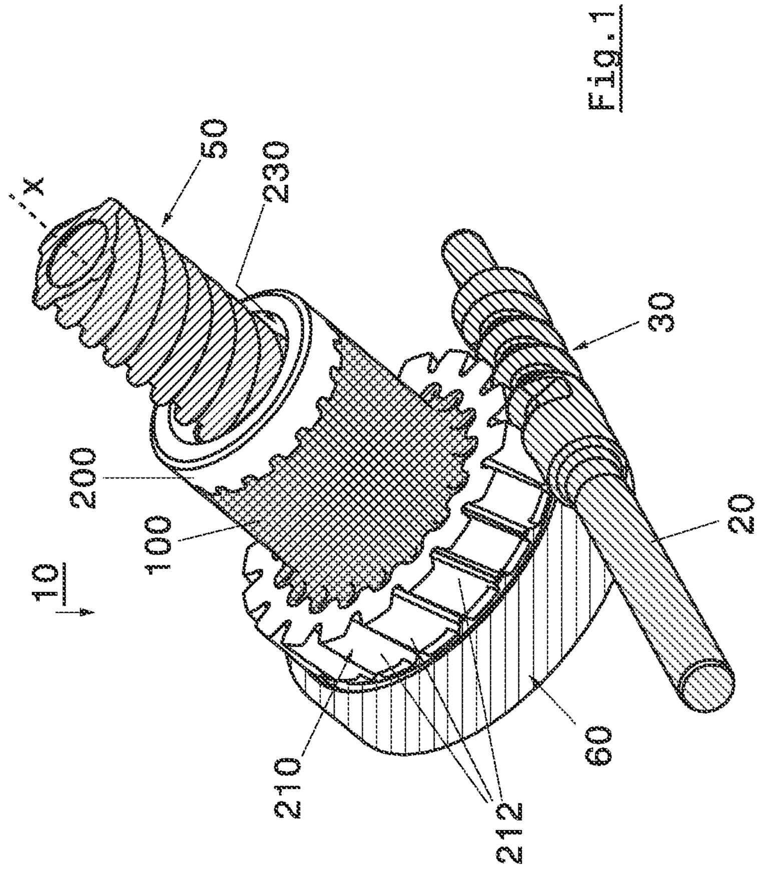
FIG. 1 is a perspective view of a multi-component gear wheel according to the invention, having a drive shaft and a spindle which is inserted into the multicomponent gear wheel.

The multi-component gear wheel 10 has outer toothing 210 having teeth 212 on the gear wheel body 200. The outer toothing 210 can be helical gear toothing and in particular helical gearing. This outer toothing 210 meshes with a worm 30, the worm 30 being fixedly mounted on a shaft 20 which can be driven by a motor (not shown in FIG. 1). Inside the gear wheel body 200 (cf. FIG. 3) there is spindle-nut toothing 230 which is engaged by a spindle 50 such that, when the worm 30 rotates, the rotational movement of said worm can be converted into a translational movement of the spindle 50 along a longitudinal axis X. The spindle can, for example, press on a piston in a hydraulic circuit which acts upon a brake or a brake piston.

On the side of the multi-component gear wheel facing away from the spindle 50 there is an extension 240 on which a radial bearing and an axial bearing 60 in the form of a ball bearing are accommodated.

Figure 3:
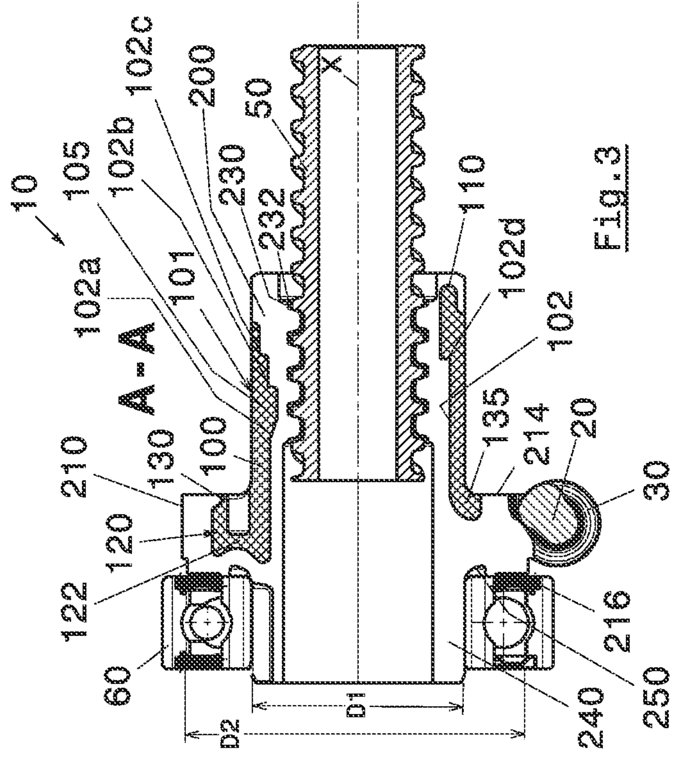
FIG. 3 is a sectional view along section line A-A of FIG. 2.
Figure 2:
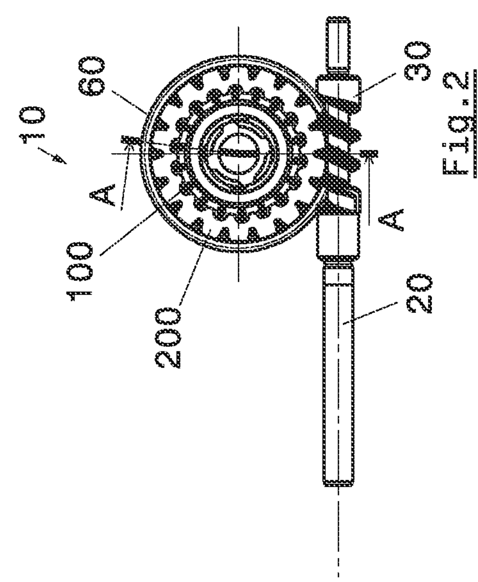
FIG. 2 shows the gear assembly from FIG. 1 in a side view looking at an end face of the multi-component gear wheel.
Figures 4, 5:
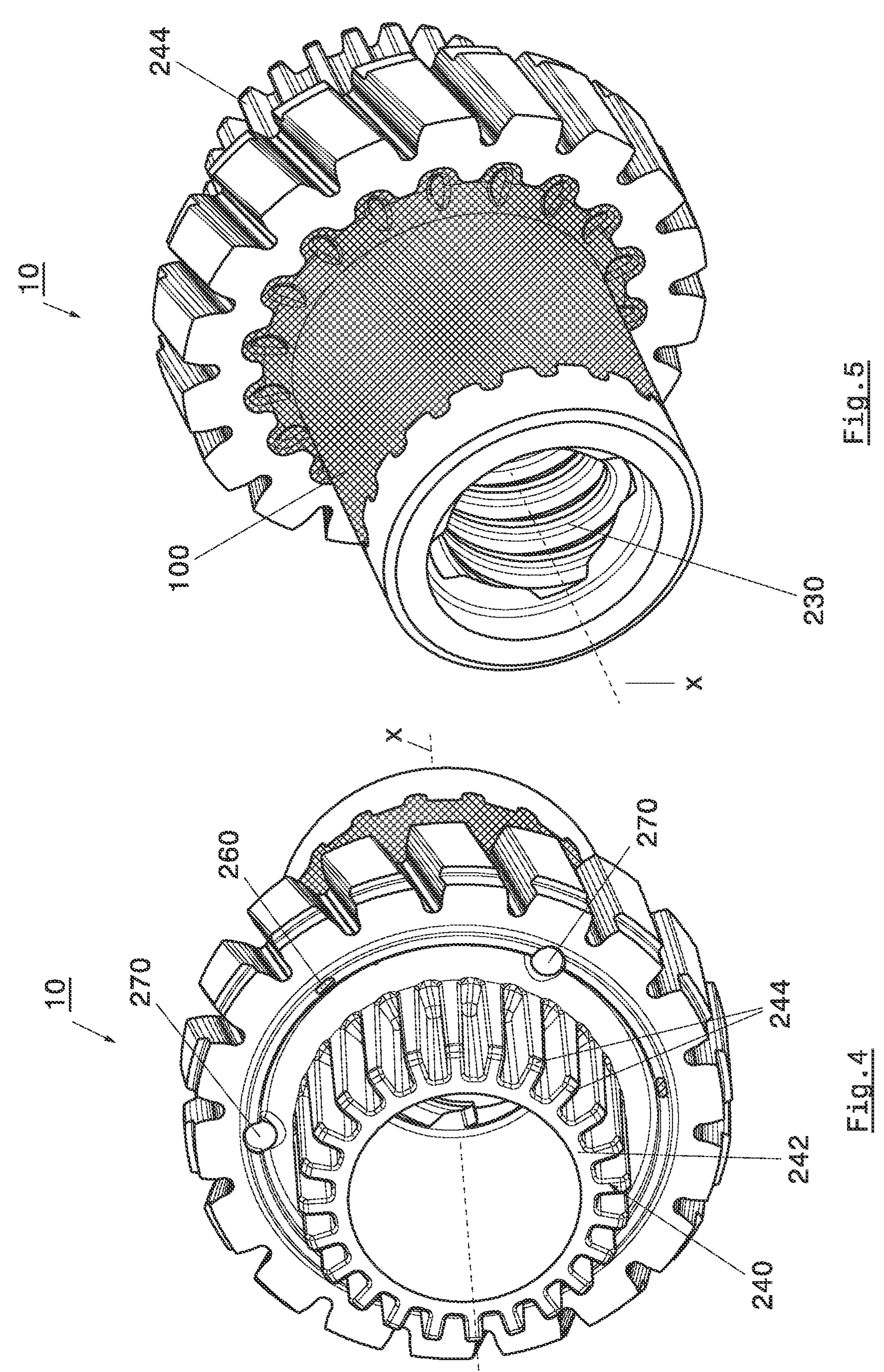
FIG. 4 shows a perspective view of the multi-component gear wheel of FIGS. 1 to 3 viewed obliquely from behind.
FIG. 5 shows the multi-component gear wheel from FIG. 4 viewed obliquely from the front in a perspective view.

This extension 240 can be seen particularly clearly in FIG. 4. The extension 240 has a smaller diameter D1 compared to the diameter D2 of the outer toothing 210. The extension (240) consists of an annular wall 242 on which ribs 244 extend radially outward for receiving the bearing 60. The bearing 60 is preferably placed in a clamping manner on these ribs 244, for which purpose the outer dimensions of the ribs 240 are selected to be slightly larger than the inner diameter of the bearing, in particular the ball bearing. FIG. 3 shows a sectional view, along section line A-A of FIG. 2, of the structure of the multi-component gear wheel 10 having the support body 100 and the gear wheel body 200 molded onto the support body 100. The support body 100 is sleeve-shaped and has an outer wall 101 and an inner wall 102. The outer wall 101 has an equal outer diameter over most of the length of the support body 100, which may be at least approximately equal to the outer diameter D1 of the extension 240 of the gear wheel body 200. At its end shown on the left in FIG. 3, the support body 100 is provided with a wall portion 120 which projects radially outwardly in the manner of a rib and engages below the teeth 212 of the outer toothing 210. The wall portions 120 arranged in the manner of ribs around the axis X each engage below a tooth 212 of the outer toothing 210. This wall portion 120 has a radial wall 122, which extends radially outward from the central axis X, with this radial wall 122 being adjoined by a further wall portion which has a distally provided undercut 130. This further wall portion is set back parallel to the outer wall 101 of the support body 100. The aforementioned radial wall 122 faces the extension 240 and is concave. Although a cup-shaped wall structure is thus shown below the teeth 212 of the outer toothing 210 in this specific exemplary embodiment, it is also within the scope of the present invention for this wall portion 120 which projects outwardly in the manner of a flange to not be cup-shaped, but rather to be solid below the respective teeth 212 of the outer toothing 210.

A connecting portion 135 is provided on the support body 100 between these wall portions 120 which project radially outwardly in the manner of a rib, as it is formed in FIG. 3 in the sectional view in the manner shown under the axis X. There, the connecting portion 135 protrudes approximately in an L-shape toward the outer toothing 210 of the gear wheel body 200.

The support body 100 has, on its inner wall 102 in the region of the spindle-nut toothing 230 of the gear wheel body 200, a tiered inner contour with tiers 102*a*, 102*b*, and 102*c*. As can also be seen in FIG. 3, the wall thickness between the outer wall 101 and the inner wall 102 of the support body 100 is not only tiered, but also provided with a thickened wall 105 in a central region. Both the thickened wall 105 and the tiers 102*a*, 102*b*, and 102*c* of the support body 100 ensure particularly high strength and stability of the support body 100 and thus also ensure increased stability and strength of the gear wheel body 200 molded onto the support body 100.

In addition, the support body 100 has at its front, distal end (cf. the right-hand end in FIG. 3) what are known as support lugs 100, which are rounded and also ensure stabilization of the overmolded gear wheel body 200. In the exemplary embodiment shown, these support lugs 110 protrude beyond the front end of the spindle-nut toothing 230 of the gear wheel body 200. Set back from these support fingers 110 is a further tier 102*d*, which also increases the strength of the support body 100.

When the multi-component gear wheel 10 is being produced, the gear wheel body 200 is injected onto or around the support body 100 in such a way as to form the contour and shape of the gear wheel body 200 shown in FIG. 3. The gear wheel body 200 protrudes, on its side shown on the right in FIG. 3, slightly beyond the support body 100, the outer diameter at this end of the gear wheel body 200 corresponding to the outer diameter D1 of the support body 100. In this region, therefore, the multi-component gear wheel 10 has a constant outer diameter, which is predominantly formed by the outer wall 101 of the body 100 at the front end and by the outer wall of the gear wheel body 200.

Inside the gear wheel body 200 is the already mentioned spindle-nut toothing 230 for receiving a spindle 50. The spindle-nut toothing 230 extends approximately halfway along the length of the gear wheel body 200. On the left of the spindle-nut toothing 230, a flange-like ring extends radially outward on the gear wheel body 200 and protrudes beyond the wall portions 120 of the support body 100, the outer toothing 210 with the teeth 212 being arranged at the outer end of this flange. This outer toothing 110 can be helical gear toothing and in particular helical gearing. The outwardly projecting flange for the outer toothing 210 has a first end face 214 pointing in the direction of the spindle toothing 230 and an opposite second end face 216 pointing toward the extension 240. At the transition between the extension 240 and the end face 216 there is a circumferential, concave indentation 250 which at least approximates the concave shape of the radial wall 122 of the support body 100. This ensures that low shearing forces are exerted on the outer wall of the gear wheel body 200 in this region and also that there is a constant wall thickness of the gear wheel body 200 on the second end face 216 in the region the of wall portions 120 designed as support ribs.

In FIG. 4 and FIG. 5 respectively, the multi-component gear wheel 10 is again shown—in each case in perspective view—from the front, looking at the extension 240, and from the rear, looking at the side of the multi-component gear wheel 10 on which the spindle 50 can be inserted into the spindle-nut toothing 230. As can be seen in particular from FIG. 4, the gear wheel body 200 has openings 260 which are located between injection points 270 at which the plastic is supplied during the injection molding of the gear wheel body 200. As the plastic enters such a mold at these injection points 270, the mold gradually fills with the support body 100 already located there, and at the end of the injection molding process this results in weld seams between the injection points 270 at which the plastic converges. It is precisely at these points that the openings 260 are placed and, during injection molding, are engaged by specially designed retaining lugs 150 of the support body 100. These retaining lugs 150 can be seen particularly clearly in FIG. 9 at the top of the support body 100.

Figures 6, 7:
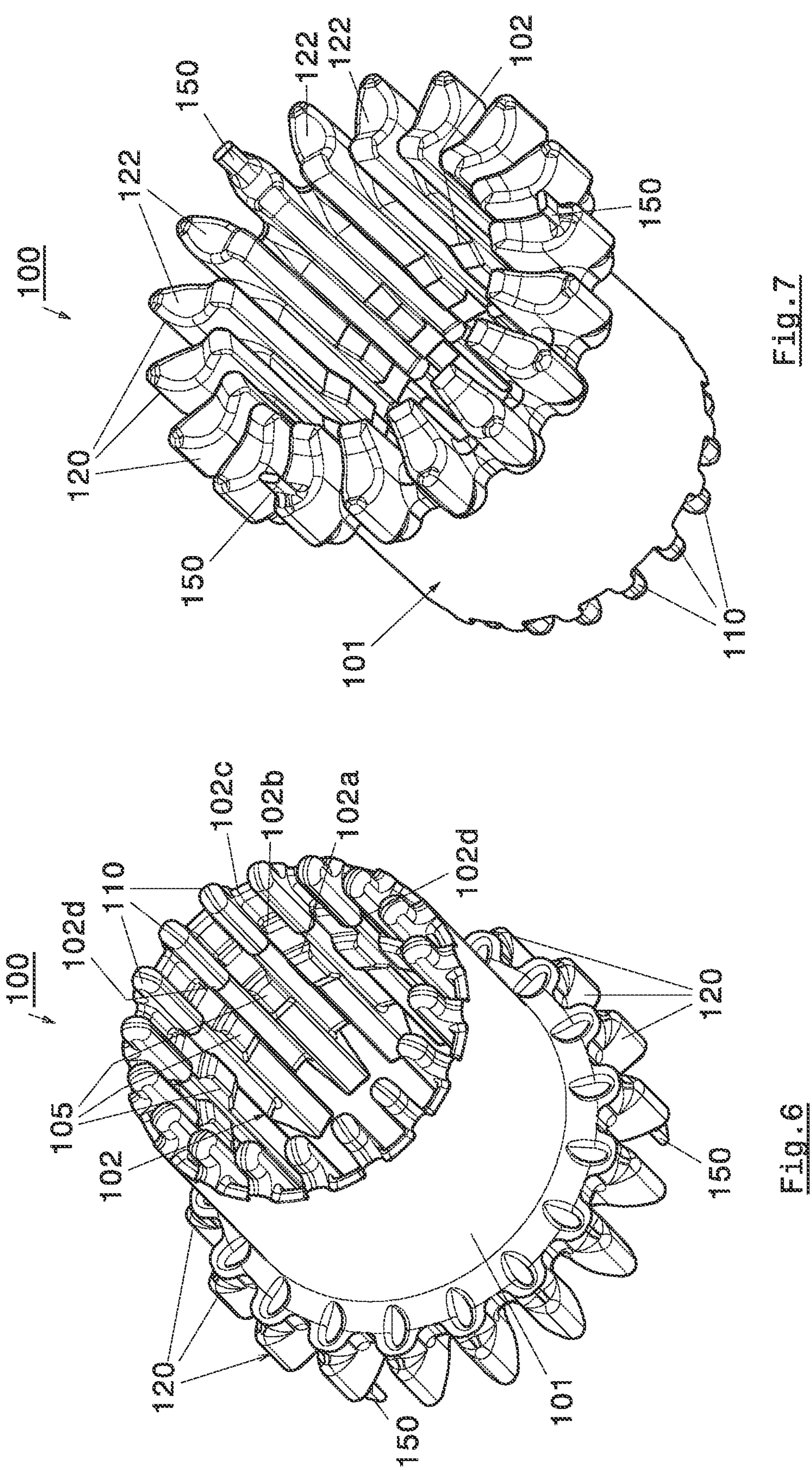
FIG. 6 shows a perspective view of the support body inserted into the multi-component gear wheel, viewed obliquely from the front.
FIG. 7 shows the support body from FIG. 6 in a perspective view obliquely from behind.

FIG. 6 shows the support body 113 in a perspective view from the front, looking at one end face with the support fingers 110 already mentioned. The tiers 102*a*, 102*b*, and 102*c* on the inner wall 102 can be seen particularly clearly in this illustration. The thickened walls 105 are also clearly visible. Between the wall portions having the mentioned tiers 102*a*, 102*b*, and 102*c*, as viewed in the circumferential direction, there are wall portions which protrude radially inward and have the mentioned support fingers 110. Slightly set back axially from the front ends of each of these support fingers 110 is a further tier 102*b*. As can be seen, wall portions with the support fingers 110 and wall portions with the thickened walls 105 alternate in the circumferential direction. The number of support fingers 110 and the number of wall portions located therebetween is preferably chosen such that this number of teeth 212 corresponds to the outer toothing 210.

The wall portions 120 which project radially outward in the manner of ribs are located on the opposite side to the support fingers 110. FIG. 7 shows the support body 100 in a perspective plan view from the side on which these wall portions 120 projecting in the manner of ribs are arranged. The number of these outwardly projecting wall portions 120 also corresponds to the number of teeth 212 of the outer toothing 210 of the tooth body 200 pointing toward the support body 100. The concave radial walls 122 can be seen particularly clearly in FIG. 7. Also visible in the exemplary embodiment shown are three support lugs 150 which protrude axially out of the support fingers 110 and which, as already mentioned in connection with FIG. 4, engage associated openings 260 in the gear wheel body 200.

Figures 8, 9:
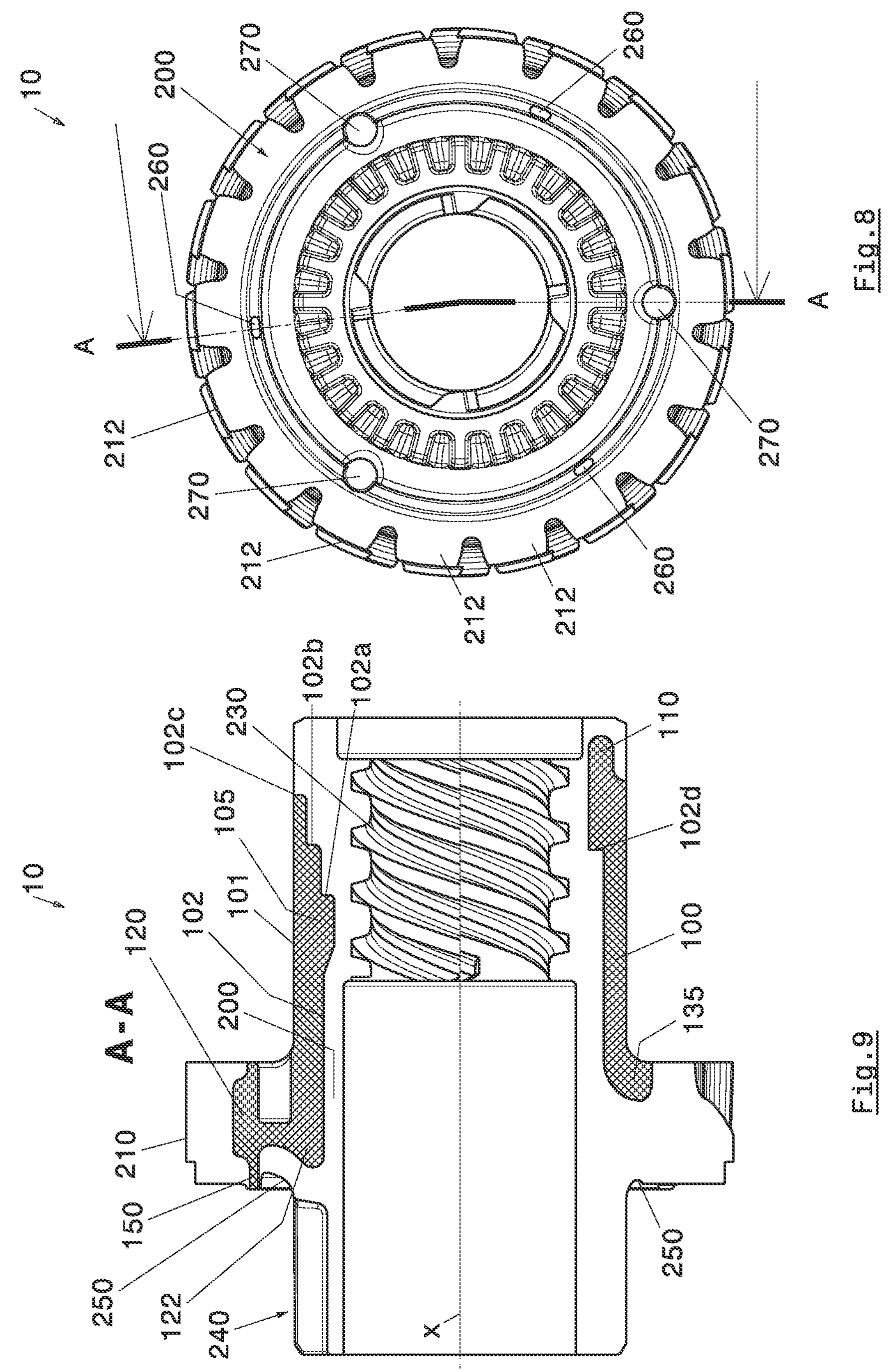
FIG. 8 shows a plan view of the multi-component gear wheel, looking at a rear side of the multi-component gear wheel, with visible injection points.
FIG. 9 shows a sectional view of the multi-component gear wheel according to the section plane A-A of FIG. 8.

In FIG. 8, the multi-component gear wheel 10 is shown again in a plan view of the side having the three injection points 270. FIG. 9 shows the associated sectional view A-A along section line A-A of FIG. 8. The already known reference signs are used again in these illustrations for the same parts.

This multi-component gear wheel 10 is expediently produced as follows:

injection molding of the sleeve-shaped support body 100 made of a first plastic material, overmolding the support body (100) with a gear wheel body (200) made of a second plastic material, which has a lower stiffness and higher elasticity than the first plastic material, wherein the gear wheel body 200 has outer toothing 210 and inner spindle-nut toothing 230 for receiving a spindle 50, the spindle-nut toothing 230 is at least partially axially spaced apart from the outer toothing 210 in one direction, the support body 200 protrudes axially at least partially into the region of the outer toothing 210 and into the region of the spindle toothing 230, and the support body (100) has a smaller outer diameter D1 than the outer toothing 210.

One option in this case is that the support body (100) can be prefabricated and placed in an injection molding die and the gear wheel body is then injection molded in a suitable mold. Alternatively, however, a particular tool can be provided in accordance with what is known as two-component technology, in which the support body 100 is first plastic-injection-molded and then the gear wheel body 200 is molded onto this support body 100 in the same mold. In both methods, the gear wheel body 200 has a plurality of injection points 270 which are preferably located axially on the side facing the rib-shaped wall portions 120 of the support body 100.

LIST OF REFERENCE NUMERALS

10 Multi-component gear wheel
20 Shaft
30 Worm
50 Spindle, actuating piston
60 Radial bearing and axial bearing
100 Support body
101 Outer wall of the support body
102 Inner wall of the support body
102*a*, 102*b*, 102*c* Tiers
105 Thickened wall
110 Support fingers
120 Wall portion
122 Radial wall
130 Undercut
135 Connecting portion
150 Support lugs
200 Gear wheel body
210 Outer toothing
212 Teeth of the outer toothing
214 First end face of the outer toothing 210
216 Second end face of the outer toothing 210
230 Spindle-nut toothing
232 End of spindle-nut toothing
240 Extension
242 Circumferential ring
244 Ribs
250 Circumferential, concave indentation
260 Openings
270 Injection points
D1 Outer diameter of the extension 240
D2 Outer diameter of the outer toothing 210
X Central and longitudinal axis
A-A Section

The invention claimed is:

1. A multi-component gear wheel (10) for a gear assembly of a brake actuator, comprising:

a sleeve-shaped support body (100) made of a first plastic material; and a gear wheel body (200) firmly integrally formed onto the sleeve-shaped support body (100) and made of a second plastic material, which has a lower stiffness and higher elasticity than the first plastic material, wherein the gear wheel body (200) has outer toothing (210) and inner spindle-nut toothing (230) for receiving a spindle (50), wherein the spindle-nut toothing (230) is at least partially axially spaced apart from the outer toothing (210) in one direction, wherein the support body (100) protrudes axially at least partially into a region of the outer toothing (210) and into a region of the spindle-nut toothing (230), wherein the support body (100) has a smaller outer diameter than the outer toothing (210), wherein the gear wheel body (200) has, on an axial side opposite the spindle-nut toothing (230), an extension (240) for receiving a radial and axial bearing (60), wherein the extension (240) is formed as a circumferential ring (242) having a number of evenly distributed ribs (244) which are directed radially outward, an outer diameter (D1) of the extension (240) being smaller than an outer diameter (D2) of the outer toothing (210), and wherein the sleeve-shaped support body (100) has a central circumferential wall having an inner wall (102) which, at least in a region of the spindle-nut toothing (230) and facing the spindle-nut toothing (230), comprises tiers.

2. The multi-component gear wheel (10) according to claim 1, characterized in that the first plastic material is glass-fiber-reinforced, aramid-fiber-reinforced, or carbon-fiber-reinforced plastic material.

3. The multi-component gear wheel (10) according to claim 1, characterized in that the second plastic material is a friction-optimized plastic material or a thermoplastic.

4. The multi-component gear wheel according to claim 1, characterized in that the inner wall (102), as viewed in the axial direction, has more than one tier (102*a*, 102*b*, 102*c*) at least in portions.

5. The multi-component gear wheel (10) according to claim 1, characterized in that the sleeve-shaped support body (100) has, at its end remote from the outer toothing (210), a large number of distal, rounded support fingers (110) which, as viewed in the axial direction, reach at least close to an end (232) of the spindle-nut toothing (230) or axially overlap said toothing.

6. The multi-component gear wheel (10) according to claim 1, characterized in that the sleeve-shaped support body (100) is at least approximately half as long as the gear wheel body (200).

7. The multi-component gear wheel (10) according to claim 1, wherein the outer toothing (210) comprises teeth (212), the outer toothing (210) comprising helical gear toothing, and wherein the sleeve-shaped support body (100) has, below each of the teeth (212), a wall portion (120) directed radially toward the helical gear toothing in order to support a relevant one of the teeth (212) of the outer toothing (210).

8. The multi-component gear wheel (10) according to claim 7, wherein the wall portion (120) is cup-shaped and is concave in a region of a radial wall (122) thereof.

9. The multi-component gear wheel (10) according to claim 1, characterized in that the gear wheel body (200) has, on the outer toothing (210) axial surface facing away from the spindle-nut toothing (230), a circumferential, concave indentation (250).

10. The multi-component gear wheel (10) according to claim 1, characterized in that the outer toothing (210) of the gear wheel body (200) is helical gear toothing.

11. The multi-component gear wheel (10) according to claim 1, characterized in that the sleeve-shaped support body (100) has undercuts (130) in the region of the helical gear toothing (210), there being one undercut for each tooth (212) of the outer toothing (210) such that a first end face (214) of a tooth (212) engages the support body (100) in a tiered manner.

12. The multi-component gear wheel (10) according to claim 1, characterized in that the sleeve-shaped support body (100) has distally located retaining lugs (150) which engage openings (260) in the gear wheel body (200) when the gear wheel body (200) is overmolded onto the support body.

13. The multi-component gear wheel according to claim 12, characterized in that the openings (260) are located at weld lines of the gear wheel body (200).

14. A brake actuator having a gear assembly which is driven by a motor and by means of which a rotational movement of a shaft (30) of the motor can be converted into a translational movement of an actuating piston or a spindle (50), wherein the gear assembly has a multi-component gear wheel (10) according to claim 1.

15. A method for producing a multi-component gear wheel (10), comprising:

injection molding a sleeve-shaped support body (100) made of a first plastic material; and overmolding the sleeve-shaped support body (100) with a gear wheel body (200) made of a second plastic material, which has a lower stiffness and higher elasticity than the first plastic material, such that the gear wheel body (200) is firmly integrally formed onto the sleeve-shaped support body (100), wherein the gear wheel body (200) has outer toothing (210) and inner spindle-nut toothing (230) for receiving a spindle (50), wherein the spindle-nut toothing (230) is at least partially axially spaced apart from the outer toothing (210) in one direction, wherein the support body (200) protrudes axially at least partially into a region of the outer toothing (210) and into a region of the spindle toothing (230), and wherein the support body (100) has a smaller outer diameter than the outer toothing (210).

16. The method for producing a multi-component gear wheel (10) according to claim 15, characterized in that the support body (100) is placed into an injection molding die and the plastic injection molding of the gear wheel body (200) is carried out via a plurality of injection points (270) axially from the side of the support body (100) on which the cup-shaped walls (120) are provided.

17. A multi-component gear wheel (10) for a gear assembly of a brake actuator, comprising:

a sleeve-shaped support body (100) made of a first plastic material; and a gear wheel body (200) firmly integrally formed onto the sleeve-shaped support body (100) and made of a second plastic material, which has a lower stiffness and higher elasticity than the first plastic material, wherein the gear wheel body (200) has outer toothing (210) and inner spindle-nut toothing (230) for receiving a spindle (50), wherein the spindle-nut toothing (230) is at least partially axially spaced apart from the outer toothing (210) in one direction, wherein the support body (100) protrudes axially at least partially into a region of the outer toothing (210) and into a region of the spindle-nut toothing (230), wherein the support body (100) has a smaller outer diameter than the outer toothing (210), wherein the outer toothing (210) comprises teeth (212), the outer toothing (210) comprising helical gear toothing, and wherein the sleeve-shaped support body (100) has, below each of the teeth (212), a wall portion (120) directed radially toward the helical gear toothing in order to support a relevant one of the teeth (212) of the outer toothing (210), and wherein the wall portion (120) is cup-shaped and is concave in a region of a radial wall (122) thereof.

* * * * *